Nov. 19, 1946.    D. J. MILLER    2,411,284
NONDETERIORATING RUBBER INSULATED WIRE
Filed June 29, 1943
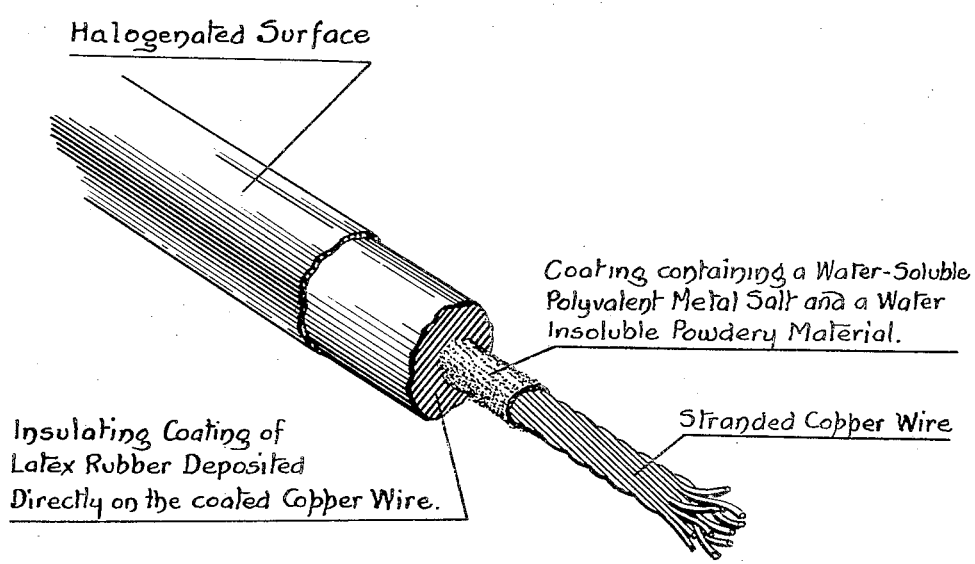

Patented Nov. 19, 1946

2,411,284

UNITED STATES PATENT OFFICE 2,411,284

NONDETERIORATING RUBBER INSULATED WIRE

Donald J. Miller, Akron, Ohio, assignor to American Anode, Inc., Akron, Ohio, a corporation of Delaware Application June 29, 1943, Serial No. 492,689

2 Claims. (Cl. 117—79)

This invention relates to insulated electrical conductors and to methods of making the same and is particularly concerned with the application of insulating coatings of latex rubber to copper wires.

It has been common practice to apply insulating coatings to copper wires by passing a wire through a bath of liquid rubber latex and depositing a coating of latex rubber on the wire. It has been considered necessary, however, first to tin the wire or to wrap it with cotton or paper or to apply a coating of lacquer to prevent direct contact between the copper and the rubber coating. Since it was known that minute quantities of copper salts would cause very rapid deterioration of rubber and that copper would be attacked by sulfur in the rubber, it was considered absolutely necessary to provide a separating barrier between the two. In actual practice, pre-tinning of the copper wire has been the most favored method and has been used almost universally in making latex coated wire.

Although not undesirable for many ordinary uses, such prior products are not satisfactory in many special cases, as where great flexibility is of vital importance, since the coating of tin or wraps of paper and the like greatly stiffen the copper wire.

This problem recently has assumed major importance because of our Government's need for a highly flexible and dependably insulated copper wire for use in certain secret detection devices, the nature of which was not disclosed to applicant. For some reason, also not disclosed to applicant, the armed services insisted upon natural rubber insulation so that it was not possible to resort to synthetic insulations which might be less susceptible to copper deterioration.

After considerable experimentation, applicant has discovered a method which makes possible the application of latex rubber insulation directly to copper wire without the interposition of tin, paper, cotton, or like protective layers and without subjecting the rubber insulation to the danger of copper-accelerated deterioration.

According to the invention, the copper wire to be coated is pre-treated with a composition preferably comprising both a water-soluble polyvalent metal salt and a water-insoluble powdery material. The pre-treated wire then is passed through liquid rubber latex and a coating of latex rubber is deposited on the wire. An insulating coating so deposited has been found to provide dependable insulation over a long period of time and to be apparently free of the expected tendency toward accelerated deterioration. Maximum flexibility of the copper wire is retained substantially unimpaired. Although the reasons for this surprising result are not fully understood, it is believed that the greatly accelerated deterioration encountered by prior workers has been due to the fact that ammonia in the latex tends to dissolve small quantities of the copper and that this soluble copper in the rubber has been responsible for its rapid deterioration. In the present invention, the latex is coagulated immediately upon contact with the wire so that a skin of coagulated rubber is formed immediately adjacent to the wire and before there is opportunity for the ammonia to dissolve any substantial amount of the copper. The powdery material assists in obtaining a uniform coating of the metal salt over the surface of the wire, prevents adhesion of the coating to the wire so that the insulation may be readily stripped when desired and also assists in guarding the copper against contact with the liquid latex. If desired, the benefits derived from the metal salts and the powdery material, respectively, may be enjoyed independently by using either without the other.

In order that the metal salt and powdery material may be applied in a uniformly thin coating over all the exposed copper surface, these materials preferably should be suspended in a readily evaporatable liquid vehicle. The wire may be immersed in the resulting composition to receive an overall liquid film coating which then may be dried to deposit the salt and powdery material on the wire in uniformly distributed finely-divided condition.

In an illustrative example of the invention, a flexible stranded copper wire made up of 40 strands of 2 mil. wire was utilized without pretreatment of any kind. The stranded copper wire was dipped in a suspension containing 1½ lbs. of soapstone in a gallon of alcohol. The wire was then withdrawn and dried until substantially all the alcohol had evaporated from the coating. The thus treated wire was then dipped in a second liquid composition containing 50 g. of zinc nitrate, 50 g. of calcium nitrate, and 1½ g. of a wetting agent dissolved in 1000 cc. of water. Again, the wire was removed from the liquid composition and dried until substantially all the water had evaporated, a drying period of from 10 to 15 minutes in hot air at 150° F. usually being adequate. The so prepared wire was then dipped in an unvulcanized but vulcanizable latex composition and left therein for from 5 to 10 seconds to coagulate on the wire a coating of latex rubber which, when dry, was about .007" thick. The wire together with its freshly coagulated latex coating then was washed thoroughly for several hours in warm water, dried for several hours in hot air, and finally vulcanized at a temperature appropriate to the particular vulcanizable composition utilized. To provide a smooth non-tacky surface finish, the rubber coated wire then was passed through a saturated water solution of chlorine gas, or other halogen solution to halogenate the surface.

The resulting product retained substantially unimpaired the inherent flexibility of the stranded copper wire and proved to be entirely satisfactory to our governmental agencies from this point of view. Contrary to all expectations, the rubber was not subject to rapid deterioration. After 28 days in a Geer oven test the insulation retained its original flexible rubbery character substantially unimpaired. The Geer oven test referred to is an accelerated aging test regularly used in the rubber industry. Although no precise correlation with actual aging conditions is possible, the 28 day period in the Geer oven may conservatively be said to equal from 5 to 10 years' aging under ordinary conditions. Similar rubber compositions containing extremely minute amounts of copper salts have been known to deteriorate to a semi-liquid mass when placed in the Geer oven for less than a week.

The single figure of the accompanying drawing is a more or less diagrammatic perspective view showing an insulated conductor made in accordance with the invention, portions of the structure being shown broken away and sectioned, and significant features being designated by appropriate legends. The figure has been drawn on a considerably enlarged scale and certain features have been exaggerated in the interest of clear illustration. Thus, the coating of metal salt and powdery material has been shown as having considerable thickness while, as a matter of fact, it is barely though definitely perceptible in the coated wire itself. Similarly, the halogenated surface shown as a distinct outer layer is in fact merely a hardened skin surface penetrating only slightly into the body of the rubber.

The latex utilized in the invention ordinarily will be a natural rubber latex in an unvulcanized condition and containing vulcanizing agents for the rubber such as dispersed sulfur and accelerators as well as antioxidants and other customary conditioning agents. It is also possible to utilize artificial dispersions of natural rubber or analogous rubber materials normally subject to deterioration in the presence of copper.

The powdery material and the metal salt may be suspended in water, alcohol, acetone, or other similar readily evaporatable volatile liquid for application to the wire. The materials may be suspended in different liquids and applied separately as in the preceding specific example or, if desired, they may be suspended in a single liquid or mixture of liquids. The mixture of zinc nitrate and calcium nitrate set out in the specific example may be replaced by an equivalent quantity of a single salt or by other substantially neutral coagulants for aqueous dispersions of rubber as distinguished from the strongly corrosive acid coagulants which should not be used. For example, zinc chloride, calcium chloride, aluminum nitrate, and the like are quite satisfactory either singly or in mixtures. The quantity of salt utilized and/or the time of immersion in the latex may be varied to produce different thicknesses of rubber in accordance with principles well established in the art. Likewise, the soapstone (talc) may be replaced by other finely-divided water-insoluble material such as finely-divided mica, magnesium carbonate, diatomaceous earths such as fossil flour, and the like.

In manufacturing short lengths of insulated wire for use in special instruments, the process may be carried out simply and conveniently by stretching the copper wire in a frame and dipping by hand in the successive liquid materials. It is also possible, however, to perform the process continuously in the manner, for example, shown in the Strube Patent 2,179,965.

Although developed particularly for the manufacture of small gauge, flexible stranded wire for the purpose indicated, the invention obviously may be used in applying insulating coatings to other types of wire and it will also be appreciated that the principles herein set out are useful in applying latex rubber coatings to copper bases in general. Further, numerous modifications and variations in details of the procedure and materials herein described may be effected by the skilled artisan without departing from the spirit and scope of the invention as defined by the appended claims.

I claim:

1. A freely-flexible insulated wire comprising a stranded copper wire, a coating consisting of a substantially neutral water-soluble polyvalent metal salt and a water-insoluble inert powdery material directly on the wire, and an insulating permanent coating of vulcanized rubber material directly overlying the so-coated wire, the rubber material being one normally subject to deterioration when in contact with copper, the insulated wire having the property of retaining its flexibility and insulating properties substantially unimpaired after 28 days in a Geer oven test.

2. An insulated wire comprising a copper wire, a coating consisting of a substantially neutral salt coagulant for aqueous dispersions of rubber and a water-insoluble inert powdery material directly on the wire, and an insulating permanent coating of vulcanized rubber material directly overlying the so-coated wire, the rubber material having the characteristics of rubber deposited directly from an aqueous dispersion of rubber material and comprising rubber normally subject to deterioration when in contact with copper, the insulated wire having the property of retaining its flexibility and insulating properties substantially unimpaired after 28 days in a Geer oven test.

DONALD J. MILLER.